(12) United States Patent
Lee et al.

(10) Patent No.: US 7,193,959 B2
(45) Date of Patent: Mar. 20, 2007

(54) INFORMATION STORAGE MEDIUM AND METHOD OF RECORDING AND/OR REPRODUCING WITH RESPECT TO THE MEDIUM

(75) Inventors: Kyung-geun Lee, Gyeonggi-do (KR); In-sik Park, Gyeonggi-do (KR); Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 10/630,927

(22) Filed: Jul. 31, 2003

(65) Prior Publication Data

US 2004/0125723 A1  Jul. 1, 2004

Related U.S. Application Data

(60) Provisional application No. 60/402,544, filed on Aug. 12, 2002.

(30) Foreign Application Priority Data

Aug. 3, 2002  (KR) .................... 10-2002-0045956

(51) Int. Cl.
*G11B 7/00* (2006.01)
(52) U.S. Cl. ............... 369/275.3; 369/47.1; 369/47.13; 369/47.27
(58) Field of Classification Search ............ 369/275.3, 369/47.1, 47.13, 47.27
See application file for complete search history.

(56) References Cited

U.S. PATENT DOCUMENTS

| 5,687,397 | A | 11/1997 | Ohmori |
|---|---|---|---|
| 5,737,639 | A | 4/1998 | Ohmori |
| 5,825,726 | A | 10/1998 | Hwang et al. |
| 5,914,917 | A | 6/1999 | Bae |
| 6,038,208 | A | 3/2000 | Shikunami et al. |
| 6,122,436 | A | 9/2000 | Okada et al. |
| 6,128,264 | A | 10/2000 | Tsutsui |
| 6,137,769 | A | 10/2000 | Sawada et al. |
| 6,243,343 | B1 | 6/2001 | Ishimura et al. |
| 6,424,615 | B1 | 7/2002 | Ishimura et al. |
| 6,459,666 | B1 | 10/2002 | Yokoi |
| 6,469,963 | B1 | 10/2002 | Sawada et al. |

(Continued)

FOREIGN PATENT DOCUMENTS

| JP | 2-278439 | 11/1990 |
|---|---|---|
| JP | 8-328933 | 12/1996 |

OTHER PUBLICATIONS

DRX-510 UL, High Performance External Dual RW DVD/CD Recorder for Microsoft Windows Operating Systems (Sony Electronics Inc. 2003).

DRU-510A High Performance Dual RW DVD/CD Recorder for Microsoft Windows 98SE, Windows Millennium Edition, Windows 2000, and Windows XP Operating Systems (Sony Electronics Inc. 2003).

(Continued)

*Primary Examiner*—Nabil Hindi
(74) *Attorney, Agent, or Firm*—Stein, McEwen & Bui, LLP

(57) ABSTRACT

An information storage medium includes an area in which updated disc-related information and recording-related information updated with a change in at least one of a disc version number and a recording speed is recorded along with existing disc-related information and recording-related information. The existing disc-related information and recording-related information are recorded, and the updated disc-related information and recording-related information is recorded in an area in which the existing disc-related information and recording-related information is recorded. Accordingly, data can be recorded/reproduced on/from a new version of information storage medium even using an existing drive.

8 Claims, 6 Drawing Sheets

| BYTE NO | CONTENTS | NUMBER OF BYTE |
|---|---|---|
| 0 | KIND OF DISC AND DISC VERSION NUMBER(DVD, Ver1.0) | 1 |
| 1 | DISC SIZE(120mm) | 1 |
| 2 | DISC STRUCTURE(SINGLE LAYER) | 1 |
| 3 | MANUFACTURER INFORMATION(SAMSUNG) | 1 |
| 4 | NUMBER OF BYTES USED FOR RECORDING INFORMATION | 1 |
| 5 | RECORDING SPEED(1.0m/s) | 1 |
| 6 | REPRODUCTION POWER | 1 |
| 7 | Ttop(T1) | 1 |
| 8 | Tmp(T2) | 1 |
| 9 | Tcl(T3) | 1 |
| 10 | RESERVED | 1 |
| 11 | KIND OF DISC AND DISC VERSION NUMBER(DVD, Ver2.0) | 1 |
| 12 | DISC SIZE(120mm) | 1 |
| 13 | DISC STRUCTURE(SINGLE LAYER) | 1 |
| 14 | MANUFACTURER INFORMATION(SAMSUNG) | 1 |
| 15 | NUMBER OF BYTES USED FOR RECORDING INFORMATION | 1 |
| 16 | RECORDING SPEED(5m/s) | 1 |
| 17 | REPRODUCTION POWER | 1 |
| 18 | Ttop(T1) | 1 |
| 19 | Tmp(T2) | 1 |
| 20 | Tcl(T3) | 1 |
| 21 | Temp(T4) | 1 |
| 22 | NUMBER OF BYTES USED FOR RECORDING INFORMATION | 1 |
| 23 | RECORDING SPEED(3m/s) | 1 |
| 24 | REPRODUCTION POWER | 1 |
| 25 | Ttop(T1) | 1 |
| 26 | Tmp(T2) | 1 |
| 27 | Tcl(T3) | 1 |
| 28 | Temp(T4) | 1 |
| 29 TO M | RESERVED | M − 28 |

U.S. PATENT DOCUMENTS

| | | |
|---|---|---|
| 2001/0036136 A1 | 11/2001 | Fukushima et al. |
| 2002/0006084 A1 | 1/2002 | Kawashima et al. |
| 2002/0181376 A1 | 12/2002 | Acker |
| 2003/0012088 A1 | 1/2003 | Bakx et al. |
| 2003/0063540 A1 | 4/2003 | Kato et al. |
| 2003/0067859 A1 | 4/2003 | Weijenbergh et al. |
| 2003/0086345 A1 | 5/2003 | Ueki |
| 2003/0090981 A1 | 5/2003 | Yokoi |

OTHER PUBLICATIONS

U.S. Appl. No. 10/630,774, filed Jul. 31, 2003, Lee et al., Samsung Electronics, Co., Ltd.

U.S. Appl. No. 10/630,965, filed Jul. 31, 2003, Lee et al., Samsung Electronics, Co., Ltd.

U.S. Appl. No. 11/296,435, filed Dec. 8, 2005, Lee et al.

Office Action dated Jan. 9, 2006 issued by Canadian Intellectual Property Office Canadian Patent Application No. 2,494,072.

FIG. 2A

| BYTE NO | CONTENTS | NUMBER OF BYTE |
|---|---|---|
| 0 | KIND OF DISC AND DISC VERSION NUMBER(DVD, Ver1.0) | 1 |
| 1 | DISC SIZE(120mm) | 1 |
| 2 | DISC STRUCTURE(SINGLE LAYER) | 1 |
| 3 | MANUFACTURER INFORMATION(SAMSUNG) | 1 |
| 4 | THE NUMBER OF BYTES USED FOR RECORDING INFORMATION | 1 |
| 5 | RECORDING SPEED | 1 |
| 6 | REPRODUCTION POWER | 1 |
| 7 | Ttop | 1 |
| 8 | Tmp | 1 |
| 9 | Tcl | 1 |
| 10 TO M | RESERVED | M-9 |

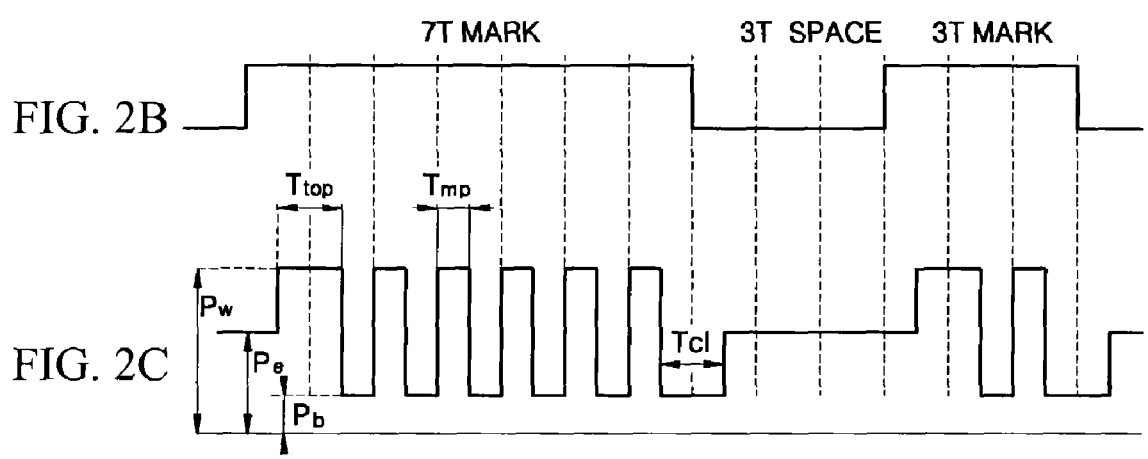

FIG. 3A

| BYTE NO | CONTENTS | NUMBER OF BYTE |
|---|---|---|
| 0 | KIND OF DISC AND DISC VERSION NUMBER(DVD, Ver1.0) | 1 |
| 1 | DISC SIZE(120mm) | 1 |
| 2 | DISC STRUCTURE(SINGLE LAYER) | 1 |
| 3 | MANUFACTURER INFORMATION(SAMSUNG) | 1 |
| 4 | NUMBER OF BYTES USED FOR RECORDING INFORMATION | 1 |
| 5 | RECORDING SPEED(1.0m/s) | 1 |
| 6 | REPRODUCTION POWER | 1 |
| 7 | Ttop(T1) | 1 |
| 8 | Tmp(T2) | 1 |
| 9 | Tcl(T3) | 1 |
| 10 | RESERVED | 1 |
| 11 | KIND OF DISC AND DISC VERSION NUMBER(DVD, Ver2.0) | 1 |
| 12 | DISC SIZE(120mm) | 1 |
| 13 | DISC STRUCTURE(SINGLE LAYER) | 1 |
| 14 | MANUFACTURER INFORMATION(SAMSUNG) | 1 |
| 15 | NUMBER OF BYTES USED FOR RECORDING INFORMATION | 1 |
| 16 | RECORDING SPEED(5m/s) | 1 |
| 17 | REPRODUCTION POWER | 1 |
| 18 | Ttop(T1) | 1 |
| 19 | Tmp(T2) | 1 |
| 20 | Tcl(T3) | 1 |
| 21 | Temp(T4) | 1 |
| 22 | NUMBER OF BYTES USED FOR RECORDING INFORMATION | 1 |
| 23 | RECORDING SPEED(3m/s) | 1 |
| 24 | REPRODUCTION POWER | 1 |
| 25 | Ttop(T1) | 1 |
| 26 | Tmp(T2) | 1 |
| 27 | Tcl(T3) | 1 |
| 28 | Temp(T4) | 1 |
| 29 TO M | RESERVED | M − 28 |

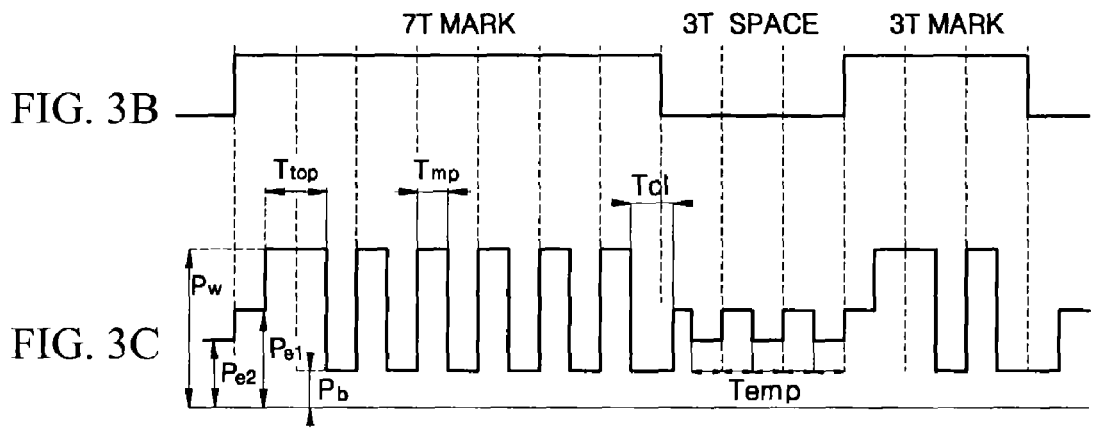
FIG. 4
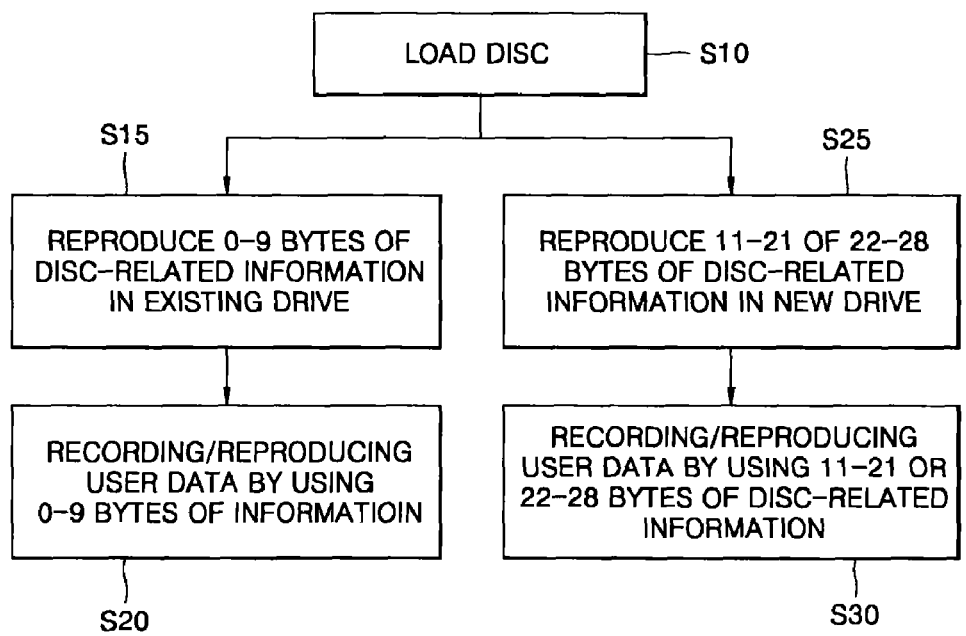

INFORMATION STORAGE MEDIUM AND METHOD OF RECORDING AND/OR REPRODUCING WITH RESPECT TO THE MEDIUM

CROSS-REFERENCE TO RELATED APPLICATIONS

This application claims the benefit of Korean Patent Application No. 2002-45956, filed on Aug. 3, 2002 in the Korean Intellectual Property Office, and of U.S. patent application Ser. No. 60/402,544, filed on Aug. 12, 2002 in the United States Patent and Trademark Office, the disclosures of which are incorporated herein in their entireties by reference.

BACKGROUND OF THE INVENTION

1. Field of the Invention

The present invention relates to an information storage medium and a recording/reproducing method therefore, and more particularly, to an information storage medium on which updated information is recorded together with existing information as a version number varies due to a physical update or a speed of the recording/reproducing medium varies, and a recording/reproducing method therefor.

2. Description of the Related Art

In general, optical information storage media (e.g., optical discs) are widely used as information media for optical pickup devices which record/reproduce information with respect to the optical discs without contacting the optical discs. According to the information recording capacity, optical discs can be classified into compact discs (CDs) and-digital versatile discs (DVDs). CD-Rs, CD-RWs, DVD-RWs, DVD-RAMs, DVD+RWs, etc., are optical discs on and from which data can be recorded, and reproduced, and/or erased.

Meanwhile, as the recording speed of the optical discs has increased and disc versions are updated, disc-related information, recording-related information, and other similar information, have to be provided to the disc drives. In particular, even though the recording speed has increased and the disc versions are updated, it is helpful for a user that a new disc is compatible with an existing drive so as to record/reproduce data with respect to the new disc. Also, when setting a disc format, it is preferable to determine the parameters of the recording-related information so as to be consistent with an existing disc format.

Reliable recording will be performed only when the disc drive operates so as to satisfy recording characteristics suitable for the recording speed of the optical discs. However, due to an increase in the recording speed of the disc drive and the optical disc, new standards for the disc drive and the optical disc are established. Thus, new discs are manufactured to be suitable with the new standards. Also, contents related to the recording characteristics, such as recording speed, recording method, or the like, are modified accordingly in the updated standards. Accordingly, in order to properly record information on an updated disc using an existing drive, updated disc version-related information which is related to other physical parameters, recording-related information, or the like have to be read by the existing drive.

However, since future disc version numbers, recording methods, or the like cannot be predicted, it is impossible to manufacture drives which are capable of covering the entire range of recording speed sand version information of future optical discs. Thus, new updated optical disc on/from which data can be recorded/reproduced using the existing drive and a recording/reproducing method therefore are required.

SUMMARY OF THE INVENTION

The, present invention provides an information storage medium from which, parameters of disc-related information and recording-related information that change with the recording speed or disc version can be recognized by an existing drive to be recorded/reproduced by the existing drive, and a recording/reproducing method therefore.

Additional aspects and/or advantages of the invention will be set forth in part in the description which follows and, in part, will be obvious from the description, or may be learned by practice of the invention.

According to an aspect of the present invention, an information storage medium includes an area in which updated disc-related information and updated recording-related information, which are updated with a change in at least one of a disc version number due to a change of physical parameters and a recording speed, is recorded along with existing disc-related information and recording-related information.

It is preferable, but not required, that the disc-related information and updated recording-related information are recorded in the same format as the existing disc-related information and the recording-related information.

According to an aspect of the invention, the updated disc-related information and recording-related information are successively recorded right after the existing disc-related information and recording-related information.

According to an aspect of the invention, a portion of the updated disc-related information and recording-related information is recorded in a same format as the existing disc-related information and recording-related information; and a number of bytes required for recording the portion of the updated disc-related information and recording-related information is different from a number of bytes required for the existing disc-related information and recording-related information. While not required, the version number is preferably positioned at a head of the related information.

According to an aspect of the invention, data recorded in a byte number different from a byte number of the existing information is a parameter related to a new recording pattern other than an existing recording pattern, and the new recording pattern includes parameters of the existing recording pattern.

According to another aspect of the invention, a method of recording/reproducing information on/from an information storage medium includes recording existing disc-related information and recording-related information in an area, and recording in the area updated disc-related information and recording-related information which have been-updated with a change in at least one of a disc version number due to a change or update of the physical features and a recording speed.

According to an aspect of the invention, the disc-related information and recording-related information are reproduced by one of a push-pull signal channel and a sum channel.

According to an aspect of the invention, a method of recording/reproducing information on/from an information storage medium by utilizing control information including version information, timing information, and recording speed information includes recording and/or reproducing existing control information with respect to a predetermined first area of the information storage medium; and recording and/or reproducing updated control information with respect to another area of the information storage medium other than the first area, wherein the version number information of the existing and updated control information includes a predetermined set of parameters used for recording and/or reproducing data with respect to the information storage medium.

According to an aspect of the invention, the updated control information is recorded in a successive manner with respect to the existing control information, one of the existing and updated control information further comprises information indicating at least one of a recording speed, a recording power, a reproduction power, and a recording pattern, one of the existing and updated control information is recorded by one of a push-pull signal channel and a sum channel, the one control information is reproduced via the push-pull signal channel and is recorded in a groove wobble format, the one control information is reproduced by the sum channel and is information that is recorded in a recordable area of at least one of a lead-in area and a lead-out area of the information storage medium, one of the existing and updated control information is recorded in a groove wobble format and in a recordable area of at least one of a lead-in area and a lead-out area of the information storage medium, and/or one of the existing and updated control information is recorded in a groove wobble.

According to an aspect of the invention, an information storage medium includes an area in which is recorded updated control information updated with a change in at least one of version information, timing information, and recording speed information relative to existing control information recorded in the area; and a user data area with respect to which a receiving drive records and/or reproduces data according to one of the updated and existing control information which corresponds to the receiving drive.

According to an aspect of the invention, the updated control information is successively recorded after the existing control information, one of the existing and updated control information further comprises information indicating at least one of a recording speed, a recording power, a reproduction power, and a recording pattern, one of the existing and updated control information is recorded by one of a push-pull signal channel and a sum channel, the one control information is to be reproduced by the push-pull signal channel and is recorded in a groove wobble format, and/or one of a lead-in area and a lead-out area disposed in an area other than the user data area, wherein the one control information is to be reproduced by the sum channel and is information recorded in a recordable area of the one of the lead-in area and the lead-out area.

According to an aspect of the invention, the information storage medium further includes one of a lead-in area and a lead-out area disposed in an area other than the user data area, wherein one of the existing and updated control information is recorded in a groove wobble format and in a recordable area of the one of the lead-in area and the lead-out area.

According to an aspect of the invention, one of the existing and updated control information is recorded in a groove wobble.

According to an aspect of the invention, a recording and/or reproducing apparatus to record and/or reproduce data with respect to an information storage medium having disc information including existing control information and updated control information includes an optical pickup to transfer data with respect to the information storage medium; and a controller which controls the optical pickup to detect the existing and updated control information from a first area of the information storage medium, to determine which of the existing and updated control information corresponds to a drive control information usable by the apparatus, and to control the optical pickup to transfer the data with respect to a second area of the information storage medium other than the first area according to the determined one of the existing and updated control information, wherein each of the existing and updated control information includes version information, timing information, and recording speed information.

According to an aspect of the invention, the existing and updated control information are successively recorded in the first area, one of the existing and updated control information further comprises information indicating at least one of a recording speed, a recording power, a reproduction power, and a recording pattern, one of the existing and updated control information is recorded by one of a push-pull signal channel and a sum channel, the one control information is reproduced via the push-pull signal channel and is recorded in a groove wobble format, the one control information is reproduced by the sum channel and is information recorded in a recordable area of at least one of a lead-in area and a lead-out area of the information storage medium, one of the existing and updated control information is recorded in a groove wobble format and in a recordable area of at least one of a lead-in area and a lead-out area of the information storage medium, and/or one of the existing and updated control information is recorded in a groove wobble.

BRIEF DESCRIPTION OF THE DRAWINGS

The above and/or other features and advantages of the present invention will become more apparent and more readily appreciated by describing in detail exemplary embodiments thereof with reference to the accompanying drawings in which:

FIG. 2A is a view explaining an information storage medium and a recording and/or reproducing method therefore according to an embodiment of the present invention;

FIGS. 2B and 2C show an example of a recording pattern for recording information on the information storage medium according to an embodiment of the present invention;

FIG. 3A is a view of a structure of data recorded on an information storage medium according to an embodiment of the present invention;

FIGS. 3B and 3C show another example of a recording pattern for recording information on the information storage medium according to an embodiment of the present invention;

FIG. 4 is a flowchart explaining a process of recording and/or reproducing information on and/or from the information storage medium according to an embodiment of the present invention.

DETAILED DESCRIPTION OF THE EMBODIMENTS

Figure 1:
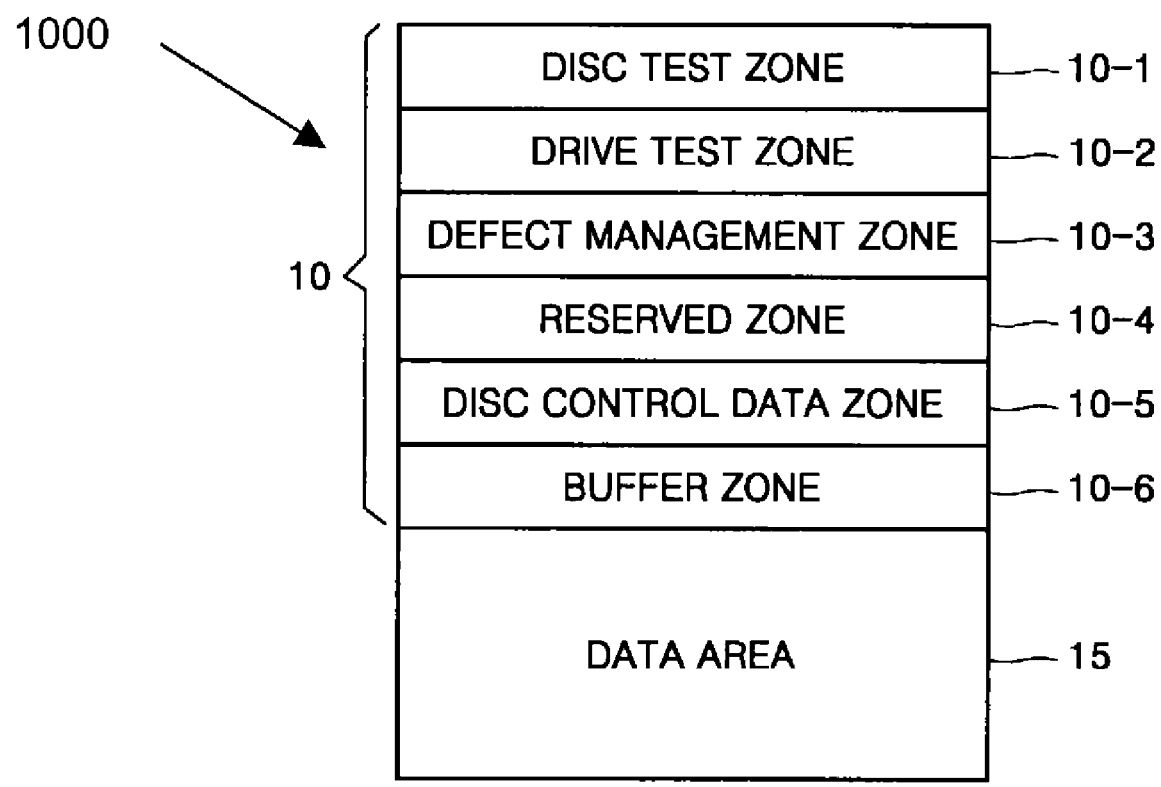
FIG. 1 is a view of data structures in a lead-in area and a user data area of an information storage medium according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows data structures of an information storage medium 1000 which includes a lead-in area 10 and a data area 15 in which user data is recorded on the information storage medium 1000. A lead-out area (not shown) has a data structure similar to the data structure in the lead-in area 10, and thus descriptions thereof will be omitted. For the shown example, the lead-in area 10 has a disc test zone 10-1, a drive test zone 10-2, a defect management zone 10-3, a disc control data zone 10-5, and a buffer zone 10-6. Also, the lead-in area 10 further includes a reserved zone 104 in which other information can be recorded.

When a recording speed is changed to improve a data transfer rate of the information storage medium, a version number and a writing strategy used for recording are also changed. For instance, the version number does not have to be updated due to a change of recording speed. For example, if some of the physical parameters are newly included, then the version number can be changed. As a specific example in a DVD-RW, there are version numbers 1.0 and 1.1. A main difference between versions 1.0 and 1.1 is whether the DVD-RW disc has copy protection, which is a function specified as a physical parameter in the corresponding format book. However, in an existing drive, a new disc version number cannot be recognized and the recording speed cannot be determined. In this situation, it is preferable, but not required, that updated disc-related information and recording-related information be provided together with the existing disc-related information and recording-related information so that a new version of disc can be used in existing and new drives using the existing and new control information as explained in detail below.

For example, FIG. 2A shows recorded disc-related information and recording-related information corresponding to a disc version 1.0. The shown disc-related information and recording-related information are recorded in a groove wobble format when mastering the disc. Before or after recording the user data, the disc-related information and recording-related information recorded in the groove wobble are copied and transferred to recordable zones in at least one of the lead-in area 10 and the lead-out area. Here, information recorded in the lead-in area 10 or the lead-out is identical to information recorded in the groove wobble.

Also, in the shown example, the information recorded in the lead-in area 10 or the lead-out area requires the same number of bytes as the information recorded in the groove wobble. In addition, the information recorded in the lead-in area 10 or the lead-out area is recorded in the same format as the information recorded in the groove wobble. According to an aspect of the invention, the groove wobble is formed in the user data area 15. Also, the disc-related information and recording-related information are recorded in the disc control data zone 10-5 in the lead-in area 10 according to an aspect of the invention.

According to an aspect of the invention, a portion of the information recorded in the wobble format may be different from a portion of the information recorded in the lead-in area 10 or the lead-out area. For example, when writing an address of a user data area 15, the maximum address of the user data area 15 may be recorded in the groove wobble, and an address of an area in which recording of user data is substantially finished may be recorded in a lead-in area 10 or a lead-out area. In this case, a portion of data recorded in the groove wobble may be different from a portion of data recorded in the lead-in area or the lead-out area.

It is understood that the disc-related information may be information on the disc kind, including the disc version number, disc size, disc structure, disc manufacturer, or the like. Also, the recording-related information may be information on the recording speed, reproduction power, and recording pattern information including information on pulse duration and intensity (e.g., Ttop, Tmp, and Tcl). Further, the disc-related information can include information such as copyright, authorship, ownership, rights to use, and other similar information.

FIGS. 2B and 2C show an example of a recording pattern corresponding to the disc version 1.0 of FIG. 2A. Here, Ttop, Tmp, and Tcl denote a start pulse time, a multi-pulse time, and a cooling pulse time, respectively. Also, Pw, Pe, and Pb denote a recording power, an erase power, and a bias power, respectively. 7T and 3T denote the minimum length of a recording mark, and T denotes a reference clock period. Information on the number of bytes used for recording the recording-related information is also recorded. With reference to this information, only necessary data can be selectively reproduced from recording-related data. In FIG. 2A, the disc-related information is recorded in 0–3 bytes and the recording-related information is recorded in 4–9 bytes. Also, 10 to M bytes may be left as a reserved area. Here, M is larger than 10.

The disc-related information or recording-related information is revised with a change of one of the version number and the recording speed. Here, while not required, it is preferable that the revised disc-related information or recording-related information is successively recorded after the existing disc-related information or recording-related information. Referring to FIG. 3A, the disc-related information and recording-related information corresponding to an existing disc version (i.e., the disc version 1.0) is recorded in 0–10 bytes and updated disc-related information or recording-related information on a new disc version or a new disc recording speed is recorded in 11-M bytes. The new disc-related information or recording-related information is recorded in the same format as the existing disc-related information and recording-related information so as to be consistent with the existing format. However, the number of bytes used for recording the disc-related information and recording-related information may vary.

For example, the difference between a recording pattern corresponding to a disc version 2.0 shown in FIGS. 3B and 3C, and the recording pattern corresponding to the disc version 1.0 shown in FIGS. 2B and 2C, is as follows. Parameters such as Ttop, Tmp, and Tcl are identical, but erase powers $P_{e2}$ and $P_{e1}$ are different, which results in the addition of a parameter Temp to an erase pattern. In this case, it is preferable, but not required, that disc-related information and recording-related information on the new disc version is recorded in 11-M bytes after the 0–10 bytes in which disc-related information and recording-related information on the existing disc version 1.0 is recorded, in the same format as for the existing disc version 1.0. In other words, the order of recording information on the new disc version is the same as the order of recording information on the existing disc version. However, as previously described, if the new disc version has an additional parameter that is not included in the existing disc version, the number of bytes may vary. Referring to FIG. 3A, since the parameter Temp is added to the recording pattern in new disc version 2.0, the disc-related information and recording-related information is recorded in 11–21 bytes.

As described above, in the new disc, the updated disc-related information and recording-related information is recorded in the same format as for the existing disc-related information and recording-related information. However, the number of bytes used for recording the new (updated) disc-related information and recording-related information may be different from the number of bytes used for recording the existing disc-related information and recording-related information. Such a case exists when the parameters related to the recording pattern are changed, but can occur for other reasons. Furthermore, an updated recording pattern may include an existing recording pattern. In other words, a new recording pattern includes the existing recording pattern parameters Ttop, Tmp, and Tcl, and additionally the parameter Temp.

According to another aspect, the disc version may not be changed, but the recording speed may vary. For example, when the disc version is the version 2.0 and the recording speed is changed from 5m/s to 3m/s, since the disc version is not changed, the disc-related information is not revised while the recording-related information is revised. Specifically, if the disc-related information is not revised, it is preferable, but not required, that the disc-related information is not again recorded such that only the revised recording-related information is recorded. As shown in FIG. 3A, in 22–28 bytes, recording-related information is recorded and is revised due to a variation in the recording speed. Also, user data is recorded by using the disc-related information recorded in 11–14 bytes and the recording-related information recorded in 22–28 bytes.

FIG. 4 is a flowchart explaining a process of recording and/or reproducing user data on and/or from the information storage medium according to an embodiment of the present invention. The process will be described with reference to FIG. 3A. First, in operation S10, a disc is loaded in a drive. Here, if the drive is an existing drive, the drive detects and reproduces disc-related data in 0–9 bytes. If the drive is a new drive, the drive detects and reproduces disc-related information and recording-related data in 11–21 or 22–28 bytes corresponding to the new version of drive. Thus, the number of bytes of reproduced data is determined by the drive version. For example, in FIG. 3A, the number of bytes of data to be reproduced for a given drive can be checked by reproducing data recorded in the fourth byte.

When data is recorded/reproduced by the existing drive, in operation S15, data corresponding to the existing drive (i.e., data recorded in 0–9 bytes) is reproduced. In operation S20, user data is recorded/reproduced by using this data. Alternatively, where data is recorded/reproduced in the new drive, in operation S25, data corresponding to the new drive (i.e., data recorded in 11–21 bytes) is reproduced. In operation S30, user data is recorded/reproduced using this data. In particular, when data is recorded/reproduced by the new drive in a disc, the version of which is not changed and the recording speed of which is changed, it is preferable that user data is recorded/reproduced by using disc-related information recorded in 11–14 bytes, and the recording-related information recorded in the 22–28 bytes.

Next, a method of recording/reproducing information on/from the information storage medium according to an embodiment of the present invention will be described. Existing disc-related information and recording-related information is recorded on an area of the information storage medium. Next, updated disc-related information and/or recording-related information, which is updated according to a change in one of the disc version number and the recording speed, is recorded in the area in which existing disc-related information and recording-related information is recorded. Here, in the shown example in FIG. 1, the area in which the existing and updated disc-related information and recording-related information is recorded is the disc control data zone 10-5.

Also, according to an embodiment of the present invention, the updated disc-related information and recording-related information is successively recorded after the bytes in which existing disc-related information and recording-related information are recorded. Here, it is preferable, but not required, that updated disc-related information and recording-related information is recorded in the same format as an existing recording format by which the existing disc-related information and recording-related information is recorded so as to be consistent with the existing recording format.

In aspects of the present invention, disc-related information and recording-related information may be reproduced by a push-pull signal channel or a sum channel. Information reproduced by the push-pull signal channel may be information recorded in a groove wobble and information reproduced by the sum channel may be information recorded in a recordable area of at least one of the lead-in area 10 and the lead-out area. Information reproduced by the sum channel may be information recorded in the same format as a mark recorded in the user data area 15.

While not specifically so limited, it is understood that the information storage medium can include the CD-Rs, CD-RWs, DVD-RWs, DVD-RAMs, DVD+RWs, as well as next generation high definition DVDs, such as Blu-ray discs and Advanced Optical Discs (AODs), or any other types of discs which can be shown or created in the future.

Figure 5:
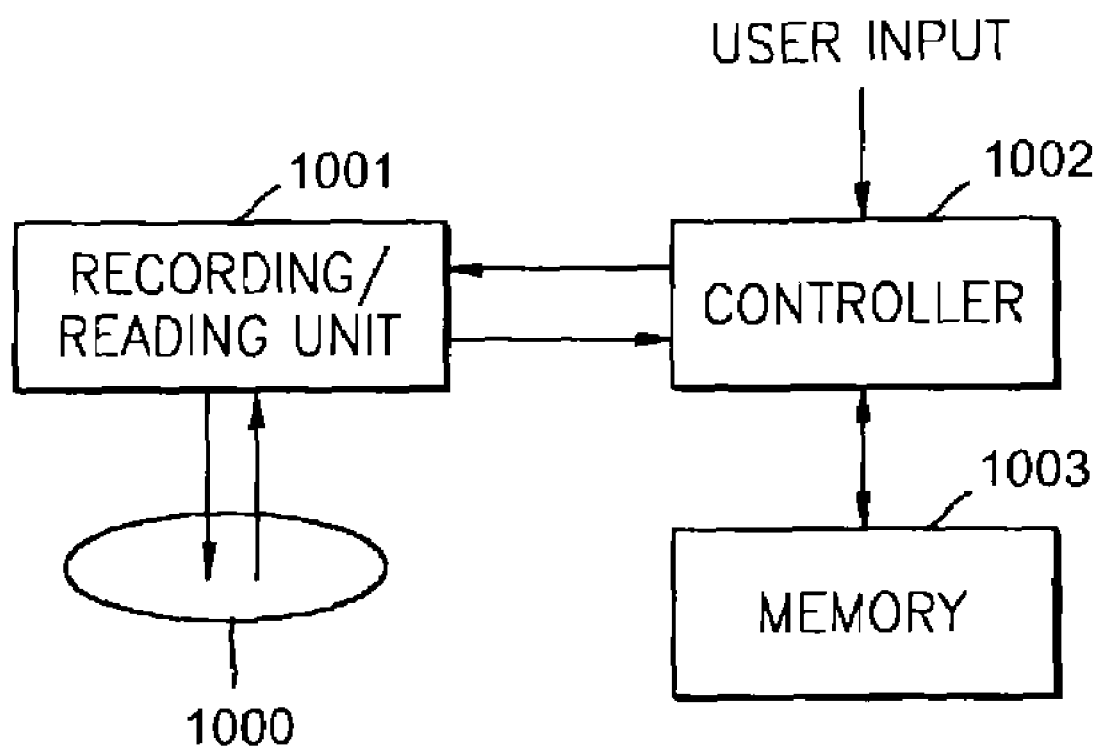
FIG. 5 is a block diagram of a recording and/or reproducing apparatus according to an embodiment of the present invention.

FIG. 5 is a block diagram of a recording apparatus according to an embodiment of the present invention. Referring to FIG. 5, the recording apparatus includes a recording/reading unit 1001, a controller 1002, and a memory 1003. The recording/reading unit 1001 records data on a disc 1000, which is an embodiment of an information storage medium 1000 of the present invention, and reads the data from the disc 1000. The controller 1002 records and reproduces disc related data according to the present invention as set forth above in relation to FIGS. 1 through 4.

While not required in all aspects, it is understood that the controller 1002 can be computer implementing the method using a computer program encoded on a computer readable medium. The computer can be implemented as a chip having firmware, or can be a general or special purpose computer programmable to perform the method.

In addition, it is understood that, in order to achieve a recording capacity of several dozen gigabytes, the recording/reading unit 1001 could include a low wavelength, high numerical aperture type unit usable to record dozens of gigabytes of data on the disc 1000. Examples of such units include, but are not limited to, those units using light wavelengths of 405 nm and having numerical apertures of 0.85, those units compatible with Blu-ray discs, and/or those units compatible with Advanced Optical Discs (AOD).

As described above, in the information storage medium and the recording/reproducing method therefore, when the disc version and the recording speed vary, updated disc-related information and recording-related information is recorded with existing disc-related information and recording-related information on the existing disc version and recording speed. Thus, data can be recorded/reproduced on/from a new version of information storage medium even using an existing drive by utilizing the existing and updated control information. Also, updated disc-related information and recording-related information can be recorded in the same format as an existing format by which existing disc-related information and recording-related information is recorded so as to be consistent with the existing format.

While the present invention has been particularly shown and described with reference to exemplary embodiments thereof, it will be understood by those of ordinary skill in the art that various changes in form and details may be made therein without departing from the spirit and scope of the present invention as defined by the following claims and equivalents thereof.

What is claimed is:

1. A method of transferring control information with respect to an information storage medium for recording and/or reproducing data with respect to the information storage medium, the method comprising:

recording/reproducing existing control information with respect to a lead-in area of the information storage medium, the existing control information including existing version number information, existing recording pattern information, existing recording speed information, and existing reproduction power information; and recording/reproducing updated control information with respect to the lead-in area of the information storage medium, the updated control information including updated version number information, updated recording pattern information, updated recording speed information, and updated reproduction power information, wherein a corresponding type of recording and/or reproducing apparatus selects between the existing and updated control information to perform recording and/or reproducing of the data with respect to the information storage medium.

2. The method of claim 1, wherein:

the existing version number information conveys a first disc version number, the updated version number information conveys a second disc version number, if the recording and/or reproducing apparatus is of a first type, the recording and/or reproducing apparatus transfers the data according to the first disc version number, and if the recording and/or reproducing apparatus is of a second type, the recording and/or reproducing apparatus transfers the data according to the second disc version number.

3. The method of claim 1, wherein:

the existing control information conveys first recording-related information including the existing recording pattern information and/or the existing recording speed information, the updated disc information conveys second recording-related information including the updated recording pattern information and/or the updated recording speed information, if the recording and/or reproducing apparatus is of a first type, the recording and/or reproducing apparatus records the data according to the first recording-related information, and if the recording and/or reproducing apparatus is of a second type, the recording and/or reproducing apparatus records the data according to the second recording-related information.

4. The method of claim 1, wherein the existing recording speed information indicates a first recording speed, and the second recording speed information indicates a second recording speed other than the first recording speed.

5. The method of claim 1, wherein the existing recording pattern information indicates a first recording waveform, and the updated recording pattern information indicates a second recording waveform other than the first recording waveform.

6. The method of claim 1, wherein the updated control information is recorded in a successive manner with respect to the existing control information.

7. The method of claim 1, wherein:

a portion of the lead-in area consists of N bytes to store the existing control information, and a portion of the lead-in area consists of M bytes to store the updated control information, where M is not equal to N.

8. The method of claim 1, wherein:

the existing and updated version number information indicate the same disc version number; and the existing recording pattern information is different from the updated recording pattern information, the existing recording speed information is different from the updated recording speed information, and/or the existing reproduction power information is different from the updated reproduction power information.

* * * * *